United States Patent
Chitrapu et al.

(10) Patent No.: US 7,912,093 B2
(45) Date of Patent: Mar. 22, 2011

(54) METHOD AND APPARATUS FOR PROVIDING PIGGYBACKED POSITIVE ACKNOWLEDGEMENT/NEGATIVE ACKNOWLEDGEMENT FIELD INDICATOR AND A POLLING INDICATOR

(75) Inventors: Prabhakar R. Chitrapu, Blue Bell, PA (US); Aghili Behrouz, Melville, NY (US); Marian Rudolf, Vitre (FR); Stephen G. Dick, Nesconset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 131 days.

(21) Appl. No.: 12/116,291

(22) Filed: May 7, 2008

(65) Prior Publication Data

US 2008/0279211 A1 Nov. 13, 2008

Related U.S. Application Data

(60) Provisional application No. 60/916,691, filed on May 8, 2007.

(51) Int. Cl.
*H04J 7/02* (2006.01)
*H04J 3/24* (2006.01)
*H04J 3/16* (2006.01)
*H04L 12/403* (2006.01)

(52) U.S. Cl. ......... 370/499; 370/346; 370/449; 370/479
(58) Field of Classification Search .......... 370/474, 370/449, 428, 349, 471, 337, 347
See application file for complete search history.

(56) References Cited

U.S. PATENT DOCUMENTS

| 5,751,741 A * | 5/1998 | Voith et al. ............. 714/758 |
| 5,946,320 A * | 8/1999 | Decker .................. 370/428 |
| 2008/0056303 A1* | 3/2008 | Sebire et al. ............ 370/474 |

FOREIGN PATENT DOCUMENTS

| EP | 1 780 926 | 5/2007 |
| EP | 1780926 A1 * | 5/2007 |
| EP | 1 858 190 | 11/2007 |

OTHER PUBLICATIONS

Ericsson, GERAN evolution—Fast Ack/Nack reporting in UL and DL, 3GPP TSG GERAN # 29, Apr. 24-28, 2006.*

(Continued)

*Primary Examiner* — Seema S. Rao
*Assistant Examiner* — Samina Choudhry
(74) *Attorney, Agent, or Firm* — Volpe And Koenig, P.C.

(57) ABSTRACT

A method and apparatus of providing a piggybacked positive acknowledgement/negative acknowledgement (ACK/NACK) (PAN) field indicator (PANI) and a polling indicator are disclosed. A combined field of a PANI bit, a relative reserved block period (RRBP) bit and an EGPRS supplementary polling (ES/P) field may indicate a polling scheme and a presence of a PAN field. Alternatively, the presence of the PAN field in the data block may be indicated by using a specific training sequence. Alternatively, a forward error correction (FEC) coding may be performed on the data block including the header, and the presence of the PAN field may be indicated by scrambling the encoded bits corresponding to the header with a specific scrambling sequence. Alternatively, a header check sequence (HCS) may be generated and the presence of the PAN field is indicated by mixing a predetermined sequence with the HCS.

10 Claims, 2 Drawing Sheets

OTHER PUBLICATIONS

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)," 3GPP TS 44.060 V7.12.0 (Mar. 2008).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 8)," 3GPP TS 44.060 V8.0.0 (Mar. 2008).

Third Generation Partnership Project, "Technical Specification Group GSM/EDGE Radio Access Network; General Packet Radio Service (GPRS); Overall description of the GPRS radio interface; Stage 2 (Release 7)", 3GPP TS 43.064 V7.4.0 (Feb. 2007).

Third Generation Partnership Project, "Technical Specification Group GSM/EDGE Radio Access Network; General Packet Radio Service (GPRS); Overall description of the GPRS radio interface; Stage 2 (Release 7)", 3GPP TS 43.064 V7.8.0 (Feb. 2008).

Third Generation Partnership Project, "Technical Specification Group GSM/EDGE Radio Access Network; Mobile radio interface layer 3 specification; Radio Resource Control (RRC) protocol (Release 7)", 3GPP TS 44.018 V7.8.0 (Mar. 2007).

Third Generation Partnership Project, "Technical Specification Group GSM/EDGE Radio Access Network; Mobile radio interface layer 3 specification; Radio Resource Control (RRC) protocol (Release 7)", 3GPP TS 44.018 V7.12.0 (Mar. 2008).

Third Generation Partnership Project, "Technical Specification Group GSM/EDGE Radio Access Network; Mobile radio interface layer 3 specification; Radio Resource Control (RRC) protocol (Release 8)", 3GPP TS 44.018 V8.2.0 (Mar. 2008).

Ericsson, "GERAN Evolution—Fast Ack/Nack Reporting in UL and DL," 3GPP TSG GERAN #29, GP-060755, San Jose Del Cabo, Mexico (Apr. 24-28, 2006).

Interdigital, "Indication of TBF Identity in PAN", 3GPP TSG GERAN Meeting No. 34, GP-070602, (Shenzhen, China, May 14-18, 2007).

Interdigital, "Simultaneous Support of PAN Indication and Polling Indicator", 3GPP TSG-GERAN #34, GP-070603, (Shenzhen, China, May 14-18, 2007).

Nokia et al., "Introduction of Fast Ack/Nack Reporting", Change Request, 44.060 CR 0909, Rev. 4, Current Version 7.8.0, 3GPP TSG-GERAN Meeting #34, G2-071037, (Shenzhen, China, May 14-18, 2007).

Nokia Siemens Networks et al., "New Combined ES/P+RRBP Field", 3GPP TSG-GERAN #34, GP-070992, (Shenzhen, China, May 14-18, 2007).

Siemens Networks et al., "Working Assumptions for FANR", 3GPP TSG-GERAN WG2 #33bis, G2-070115, (Montreal, Canada, Mar. 26-30, 2007).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)," 3GPP TS 44.060 V7.1.0 (Sep. 2005).

Third Generation Partnership Project, "Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol (Release 7)," 3GPP TS 44.060 V7.12.0 (Mar. 2008).

* cited by examiner

BIT

| 8 | 7 | 6 | 5 | 4 | 3 | 2 | 1 | OCTET |
|---|---|---|---|---|---|---|---|---|
| TFI | | RRBP | | ES/P | | USF | | 1 |
| BSN1 | | PR | | | TFI | | | 2 |
| BSN1 | | | | | | | | 3 |
| BSN2 | | | | | | | BSN1 | 4 |
| CPS | | | | | BSN2 | | | 5 |

BIT

| 8 | 7 | 6 | 5 | 4 | 3 | 2 | 1 | OCTET |
|---|---|---|---|---|---|---|---|---|
| TFI | | RRBP | | ES/P | | USF | | 1 |
| BSN1 | | PR | | | TFI | | | 2 |
| BSN1 | | | | | | | | 3 |
| | | | | CPS | | | BSN1 | 4 |

BIT

| 8 | 7 | 6 | 5 | 4 | 3 | 2 | 1 | OCTET |
|---|---|---|---|---|---|---|---|---|
| TFI | | RRBP | | ES/P | | USF | | 1 |
| BSN1 | | PR | | | TFI | | | 2 |
| BSN1 | | | | | | | | 3 |
| SPB | | | CPS | | | | BSN1 | 4 |

METHOD AND APPARATUS FOR PROVIDING PIGGYBACKED POSITIVE ACKNOWLEDGEMENT/NEGATIVE ACKNOWLEDGEMENT FIELD INDICATOR AND A POLLING INDICATOR

CROSS REFERENCE TO RELATED APPLICATION

This application claims the benefit of U.S. provisional application No. 60/916,691 filed May 8, 2007, which is incorporated by reference as if fully set forth.

FIELD OF INVENTION

This application is related to wireless communications.

BACKGROUND

Latency reduction is one of the considerations in a GSM/EDGE radio access network (GERAN). Two techniques have been proposed for the latency reduction: reduced transmission time interval (RTTI) and fast acknowledgement/non-acknowledgement (ACK/NACK) reporting (FANR).

Under current GERAN protocols, the network may obtain feedback data, (i.e., ACK/NACK of downlink data packets), from the mobile station through polling. The polling is indicated by an evolved general packet radio service (EGPRS) supplementary polling (ES/P) field. Two (2) ES/P bits indicate whether a relative reserved block period (RRBP) field is valid or not and what fields the next uplink control block shall contain.

FIGS. 1-3 show conventional EGPRS downlink radio link control/medium access control (RLC/MAC) header types 1, 2, and 3, respectively. Both the ES/P field and the RRBP field are present in all three RLC/MAC header types. Table 1 shows the meaning of the conventional 2-bit ES/P field.

TABLE 1

| bits | | ES/P |
|---|---|---|
| 5 | 4 | |
| 0 | 0 | RRBP field is not valid (no Polling) |
| 0 | 1 | RRBP field is valid - Extended Ack/Nack bitmap type FPB |
| 1 | 0 | RRBP field is valid - Piggy-backed Ack/Nack bitmap type FPB |
| 1 | 1 | RRBP field is valid - Extended Ack/Nack bitmap type NPB, measurement report included |

Conventionally, an ACK/NACK report is sent in an explicit message, also referred to as an RLC/MAC control block. The ACK/NACK report is addressed to a particular radio resource, called a Temporary Block Flow (TBF). A TBF is a temporal connection between a mobile station and a network to support a uni-directional transfer of data. A TBF is temporary and is maintained only for the duration of the data transfer.

It has been proposed that the ACK/NACK feedback for a certain TBF be "piggybacked" on an RLC/MAC data block that may be addressed to another TBF. The field that carries this ACK/NACK feedback is referred to as "piggybacked ACK/NACK (PAN) field". The presence or absence of the PAN field in the RLC/MAC data block is indicated by a PAN indicator (PANI).

In order to send the PANI, an extra bit may be included in a downlink data packet header as shown in FIGS. 1-3. However, currently there is no available space in the downlink data packet header. It has been proposed to split the conventional 2-bit RRBP field such that one bit is used for the RRBP field and the other bit is used for the PANI. Tables 2 and 3 show the meaning of the 1-bit RRBP field and 1-bit PANI field.

TABLE 2

| Bit | Full-rate PDCH uplink block with TDMA frame number |
|---|---|
| 0 | (N + 8 or N + 9) mod 2715648 |
| 1 | (N + 13) mod 2715648 |

TABLE 3

| bit | PANI |
|---|---|
| 0 | A PAN field is not included |
| 1 | A PAN field is included |

In accordance with this proposal, the header size remains the same. However, there is redundancy in bit combinations. If the ES/P bits are "00", (i.e., when there is no polling request), the combinations of the RRBP bit and the PANI bit include wastage of three (3) combinations. Therefore, it would be desirable to provide a scheme for more efficient signaling of a PANI, an RRBP, and a polling indicator.

SUMMARY

A method and apparatus of providing a PANI and a polling indicator are disclosed. A combined field of a PANI bit, an RRBP bit, and an ES/P field may indicate a polling scheme and a presence of a PAN field. Alternatively, the presence of the PAN field in the data block may be indicated by using a specific training sequence. Alternatively, a forward error correction (FEC) coding may be performed on the data block including the header, and the presence of the PAN field may be indicated by scrambling the encoded bits corresponding the header with a specific scrambling sequence. Alternatively, a header check sequence (HCS) may be generated and the presence of the PAN field is indicated by mixing a predetermined sequence with the HCS. Block sequence number 2 (BSN2) bits may be used to indicate the existence of a PAN field.

BRIEF DESCRIPTION OF THE DRAWINGS

A more detailed understanding may be had from the following description, given by way of example in conjunction with the accompanying drawings wherein.

DETAILED DESCRIPTION

Figures 1, 2, 3, 4:
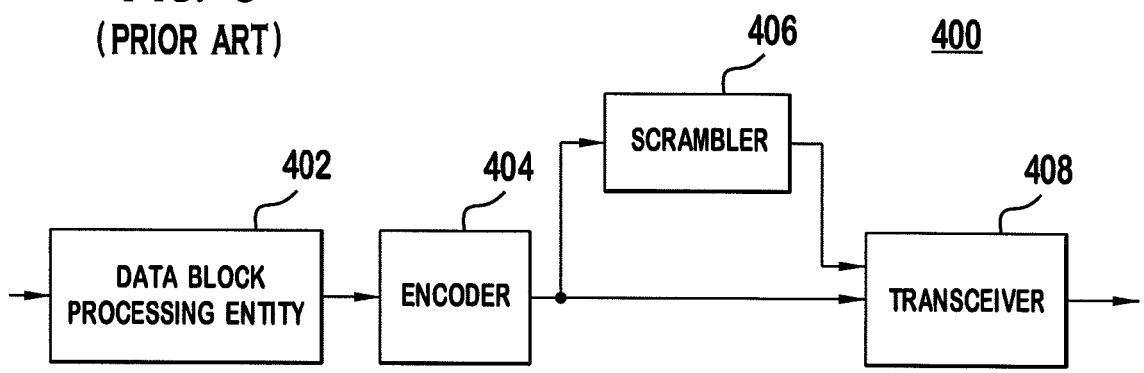
FIGS. 1-3 show conventional EGPRS downlink RLC/MAC header types 1, 2, and 3, respectively.
FIG. 4 is a block diagram of a base station in accordance with the third embodiment.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

In accordance with a first embodiment, a 1-bit PANI field, a 1-bit RRBP field, and a 2-bit ES/P field in an RLC/MAC header are combined together to indicate a polling scheme and an existence of a PAN field in the data block. The bit combinations of the PANI field, the RRBP field and the ES/P field do not have any redundancy. Example PANI, RRBP and ES/P bit combinations and their meaning are shown in Table 4.

In Table 4, the first bit, read from left, is a PANI field, the second bit is an RRBP field, and the third and fourth bits are an ES/P field. When the first bit, (i.e., the PANI field), is set to '1', it indicates that a PAN field is included in the data block, and if the first bit is set to '0', it indicates that a PAN field is not included in the data block. It should be noted that the bit combinations in Table 4 are provided as an example, not as a limitation, and any other combination may be used and any other meaning may be associated with the bit combinations.

TABLE 4

| PANI + RRBP + ES/P | | | | Meaning |
|---|---|---|---|---|
| 0 | 0 | 0 | 0 | No Polling; No PAN |
| 0 | 1 | 0 | 0 | Polling (FPB bitmap; N + M); No PAN |
| 1 | 0 | 0 | 0 | Polling (FPB bitmap as UL-PAN; N + M); PAN |
| 1 | 1 | 0 | 0 | No Polling; PAN |
| 0 | 0 | 0 | 1 | Polling (FPB bitmap; N + 8 or N + 9); No PAN |
| 0 | 1 | 0 | 1 | Polling (FPB bitmap; N + 13); No PAN |
| 1 | 0 | 0 | 1 | Polling (FPB bitmap; N + 8 or N + 9); PAN |
| 1 | 1 | 0 | 1 | Polling (FPB bitmap; N + 13); PAN |
| 0 | 0 | 1 | 0 | Polling (FPB bitmap as UL-PAN; N + 8 or N + 9); No PAN |
| 0 | 1 | 1 | 0 | Polling (FPB bitmap as UL-PAN; N + 13); No PAN |
| 1 | 0 | 1 | 0 | Polling (FPB bitmap as UL-PAN; N + 8 or N + 9); PAN |
| 1 | 1 | 1 | 0 | Polling (FPB bitmap as UL-PAN; N + 13); PAN |
| 0 | 0 | 1 | 1 | Polling (CQR - NPB bitmap; N + 8 or N + 9); No PAN |
| 0 | 1 | 1 | 1 | Polling (CQR - NPB bitmap; N + 13); No PAN |
| 1 | 0 | 1 | 1 | Polling (CQR - NPB bitmap; N + 8 or N + 9); PAN |
| 1 | 1 | 1 | 1 | Polling (CQR - NPB bitmap; N + 13); PAN |

For example, the bit combinations 0100 and 1000 may be used to specify additional polling schemes, (e.g., those eliminated in reducing the conventional RRBP bits from 2 to 1), or to demand reporting of channel quality report (CQR) or next partial bitmap (NPB) when there is not enough space to send both. The parameter M may be chosen suitably.

In accordance with a second embodiment, a training sequence is used to indicate the presence of the PAN field in the RLC/MAC data block. Under the current GERAN specification, one of eight (8) training sequences is used for communication between a WTRU and a network in a cell. In accordance with the second embodiment, eight (8) training sequence groups are defined with each group having two (2) training sequences. One training sequence is used in a cell for all communications between the WTRU and the network and the presence of a PAN field in the RLC/MAC data block is indicated by using the other training sequence in that training sequence group.

In accordance with a third embodiment, a scrambling code is used to indicate the presence of the PAN field in the RLC/MAC data block. FIG. 4 is a block diagram of a base station 400 in accordance with the third embodiment. The base station 400 includes a data block processing entity 402, an encoder 404, a scrambler 406, and a transceiver 408. The data block processing entity 402 generates a data block including a header. The header includes the ES/P field and the RRBP field. The encoder 404 performs an FEC coding on the data block including the header. If the data block does not include a PAN field, the data block is transmitted by the transceiver 408 as in the prior art. If the data block includes a PAN field, the scrambler 406 scrambles the encoded bits corresponding to the header with a scrambling sequence and the data block including the scrambled bits are transmitted by the transceiver 408.

For scrambling, the encoded bits are modulo-2 added to a pre-specified scrambling sequence. The length of the scrambling sequence may be same to that of the encoded bits corresponding to the header. The scrambling sequence is unique and known to both the base station and the WTRU. The scrambling code may be generated in a number of ways, or selected in accordance with criterion that the distance between the scrambling code and the all "zero" sequence is maximized.

Figure 5:
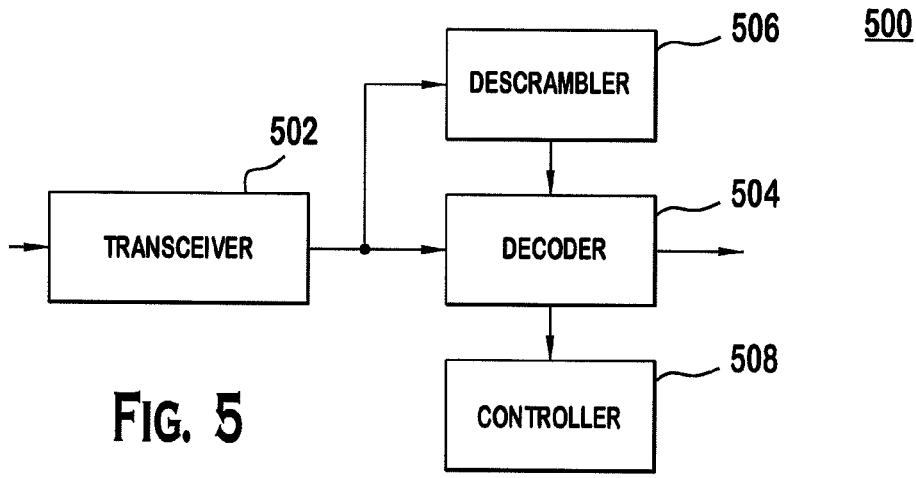
FIG. 5 is a block diagram of a WTRU in accordance with the third embodiment.

FIG. 5 is a block diagram of a WTRU 500 in accordance with the third embodiment. The WTRU 500 includes a transceiver 502, a decoder 504, a descrambler 506, and a controller 508. The transceiver 502 receives a bit sequence of a data block from the base station 400. The decoder 504 performs FEC decoding on the received bit sequence as in the prior art. If the data block does not include a PAN field and therefore the bits corresponding to the header was not scrambled at the base station 400, the decoder 504 may succeed in decoding. However, if the data block includes a PAN field and therefore the bits corresponding to the header was scrambled at the base station 400, the received bit sequence will be rejected due to having too many bit errors. If the received bit sequence is rejected, the received bits corresponding to the header are descrambled, (i.e., moculo-2 added with the scrambling sequence), by the descrambler 506. The received bit sequence with the descrambled header portion of the bit sequence is then decoded again by the decoder 504. If the second FEC decoding is successful, the controller 508 detects that a PAN field is included in the data block.

In accordance with a fourth embodiment, a modified HCS is used to indicate the presence of the PAN field. A radio block for data transfer includes one RLC/MAC header, an HCS, one or more RLC data block(s), and a block check sequence (BCS). The data block may include a PAN field and an optional PAC check sequence (PCS). The HCS is used for error detection of the RLC/MAC header. The HCS may be eight bits long.

Figure 6:
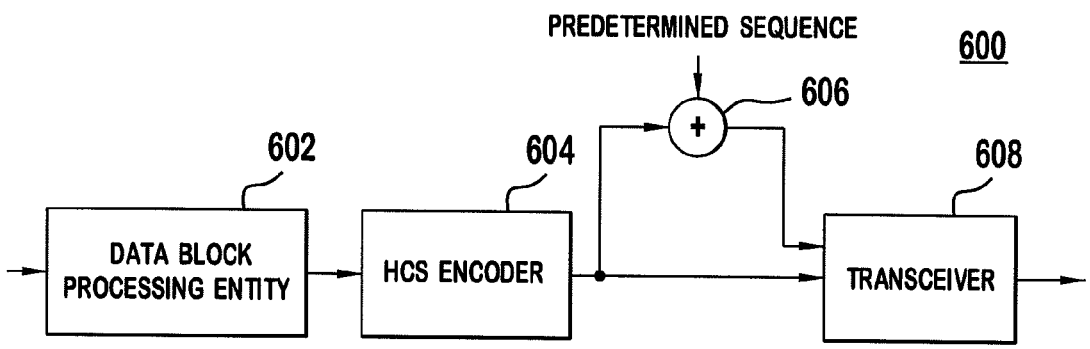
FIG. 6 is a block diagram of a base station in accordance with the fourth embodiment.

FIG. 6 is a block diagram of a base station 600 in accordance with the fourth embodiment. The base station 600 includes a data block processing entity 602, a HCS encoder 604, a modulo-2 adder 606, and a transceiver 608. The data block processing unit 602 generates a data block including a header. The header includes an ES/P field and an RRBP field. The HCS encoder 604 generates an HCS. If the radio block does not include a PAN field, the radio block is transmitted by the transceiver 608 as in the prior art. If the radio block includes a PAN field, the modulo-2 adder 606 adds a predetermined sequence to the HCS, and the radio block with the modified HCS is transmitted by the transceiver 608. For example, a sequence 11111111 may be used as the predetermined sequence. In this case, the HCS bits are inverted.

Figure 7:
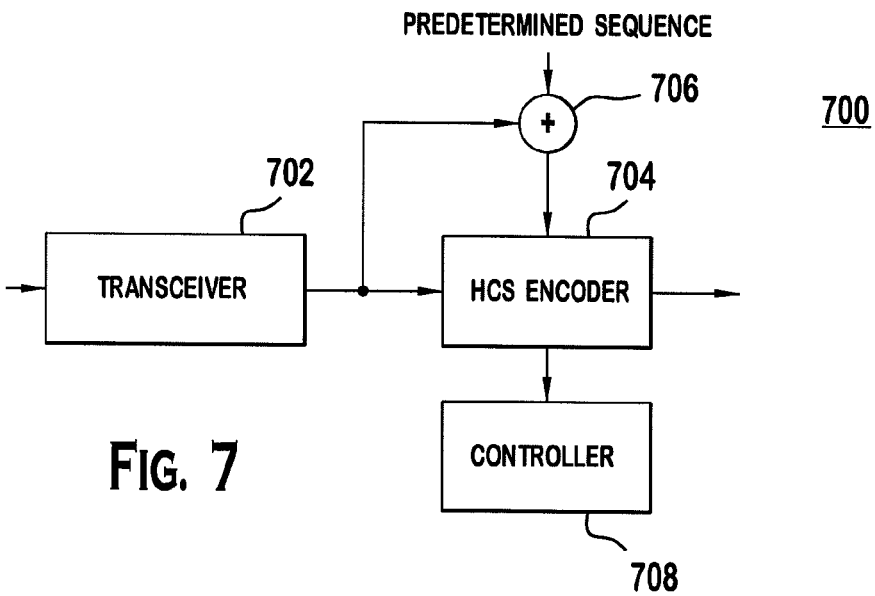
FIG. 7 is a block diagram of a WTRU in accordance with the fourth embodiment.

FIG. 7 is a block diagram of a WTRU 700 in accordance with the fourth embodiment. The WTRU 700 includes a transceiver 702, an HCS decoder 704, a modulo-2 adder 706, and a controller 708. The transceiver 702 receives a data block from the base station 600. The HCS decoder 704 performing HCS decoding with the received header of the data block and the received HCS. If the header is received error free, (i.e., the HCS check passes), the controller 708 may assume that no PAN is present in the RLC/MAC data block. If the HCS check fails, the received header is modulo-2 added with the predetermined sequence by the modulo-2 adder 706, and HCS check is performed again. If the second HSC check passes, the controller 708 may assume that the header is correct and the PAN field is included in the RLC/MAC data block.

In accordance with a fifth embodiment, the existence of a PAN field may be signaled using block sequence numbers (BSNs). Currently, the header includes an 11 bit BSN1 and a 10 bit BSN2. Once the BSN1 is specified, BSN2 is forced to be within a certain vicinity of BSN1. The vicinity is specified by a window size (WS). Conventionally, a WS of 10 bits is adequate. In accordance with the fifth embodiment, the current WS is halved so that only 9 bits are needed to signal BSN2. The unused tenth BSN2 bit in the header may be used to indicate a PANI.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method of fast acknowledgement/non acknowledgement reporting (FANR) operation, the method comprising:
   receiving a temporary block flow (TBF) including a radio link control/medium access control (RLC/MAC) header and a corresponding RLC/MAC data block, wherein the RLC/MAC header includes a four-bit sequence simultaneously indicating both information regarding a positive acknowledgement/negative acknowledgement (ACK/NACK) polling scheme and a presence or absence of a piggybacked ACK/NACK (PAN) field in the corresponding RLC/MAC data block, wherein one bit of the four-bit sequence is assigned to indicate the presence or absence of the PAN field in the corresponding RLC/MAC data block, and each of a plurality of bit combinations of the bit assigned for indicating the presence or absence of the PAN field and remaining three bits of the four-bit sequence indicates a different combination of the ACK/NACK polling scheme and the presence or absence of the PAN field in the corresponding RLC/MAC data block; and
   processing the four-bit sequence in the RLC/MAC header to identify the ACK/NACK polling scheme and the presence or absence of a PAN field in the corresponding RLC/MAC data block.

2. The method of claim 1, wherein the information regarding the ACK/NACK polling scheme in the four-bit sequence includes a relative reserved block period (RRBP) indicator and an evolved general packet radio service (E-GPRS) supplementary polling (ES/P) indicator.

3. The method of claim 1, wherein the PAN field in the RLC/MAC data block is addressed to a first wireless transmit/receive unit (WTRU) and data in the RLC/MAC data block is addressed to a second WTRU.

4. The method of claim 1, wherein the TBF is received via a GSM/EDGE radio access network (GERAN).

5. A wireless transmit/receive unit (WTRU) for fast acknowledgement/non-acknowledgement reporting (FANR) operation, the WTRU comprising:
   a transceiver configured to receive a temporary block flow (TBF) including a radio link control/medium access control (RLC/MAC) header and a corresponding RLC/MAC data block, wherein the RLC/MAC header includes a four-bit sequence simultaneously indicating both information regarding a positive acknowledgement/negative acknowledgement (ACK/NACK) polling scheme and a presence or absence of a piggybacked ACK/NACK (PAN) field in the corresponding RLC/MAC data block, wherein one bit of the four-bit sequence is assigned to indicate the presence or absence of the PAN field in the corresponding RLC/MAC data block, and each of a plurality of bit combinations of the bit assigned for indicating the presence or absence of the PAN field and remaining three bits of the four-bit sequence indicates a different combination of the ACK/NACK polling scheme and the presence or absence of the PAN field in the corresponding RLC/MAC data block; and
   a controller configured to process the four-bit sequence in the RLC/MAC header to identify the ACK/NACK polling scheme and the presence or absence of the PAN field in the corresponding RLC/MAC data block.

6. The WTRU of claim 5, wherein the information regarding the ACK/NACK polling scheme in the four-bit sequence includes a relative reserved block period (RRBP) indicator and an evolved general packet radio service (E-GPRS) supplementary polling (ES/P) indicator.

7. The WTRU of claim 5, wherein the PAN field in the RLC/MAC data block and data in the RLC/MAC data block are addressed to different WTRUs.

8. The WTRU of claim 5, wherein the TBF is received via a GSM/EDGE radio access network (GERAN).

9. A method of fast acknowledgement/non-acknowledgement reporting (FANR) operation, the method comprising:
   generating a radio link control/medium access control (RLC/MAC) header including a four-bit sequence simultaneously indicating information regarding a positive acknowledgement/negative acknowledgement (ACK/NACK) polling scheme and a presence or absence of a piggybacked ACK/NACK (PAN~field in a corresponding RLC/MAC data block, wherein one bit of the four-bit sequence is assigned to indicate the presence or absence of the PAN field in the corresponding RLC/MAC data block, and each of a plurality of bit combinations of the bit assigned for indicating the presence or absence of the PAN field and remaining three bits of the four-bit sequence indicates a different combination of the ACK/NACK polling scheme and the presence or absence of the PAN field in the corresponding RLC/MAC data block; and transmitting the RLC/MAC header and the corresponding RLC/MAC data block.

10. An apparatus for fast acknowledgement/non-acknowledgement reporting (FANR) operation, the apparatus comprising:

a controller configured to generate a radio link control/medium access control (RLC/MAC) header including a four-bit sequence simultaneously indicating information regarding a positive acknowledgement/negative acknowledgement (ACK/NACK) polling scheme and a presence or absence of a piggybacked ACK/NACK (PAN) field in a corresponding RLC/MAC data block, wherein one bit of the four-bit sequence is assigned to indicate the presence or absence of the PAN field in the corresponding RLC/MAC data block, and each of a plurality of bit combinations of the bit assigned for indicating the presence or absence of the PAN field and remaining three bits of the four-bit sequence indicates a different combination of the ACK/NACK polling scheme and the presence or absence of the PAN field in the corresponding RLC/MAC data block; and a transceiver configured to transmit the RLC/MAC header and the corresponding RLC/MAC data block.

* * * * *

UNITED STATES PATENT AND TRADEMARK OFFICE
CERTIFICATE OF CORRECTION

PATENT NO. : 7,912,093 B2  Page 1 of 1
APPLICATION NO. : 12/116291
DATED : March 22, 2011
INVENTOR(S) : Chitrapu et al.

It is certified that error appears in the above-identified patent and that said Letters Patent is hereby corrected as shown below:

ON THE TITLE PAGE

Item (56) "OTHER PUBLICATIONS", page 2, right column, after "TS 44.060", delete "V7.12.0 (Mar. 2008)" and insert --V.7.8.0 (March 2007)--.

At Claim 9, column 7, line 4, delete "PAN~field" and insert --(PAN) field--.

Signed and Sealed this
Sixteenth Day of August, 2011

David J. Kappos
*Director of the United States Patent and Trademark Office*